US011438646B2

(12) United States Patent
Zhou et al.

(10) Patent No.: US 11,438,646 B2
(45) Date of Patent: Sep. 6, 2022

(54) VIDEO PLAY METHOD AND APPARATUS, AND DEVICE (71) Applicant: TENCENT TECHNOLOGY (SHENZHEN) COMPANY LIMITED, Shenzhen (CN)

(72) Inventors: Bin Zhou, Shenzhen (CN); Jie Qi, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 16/910,909

(22) Filed: Jun. 24, 2020

(65) Prior Publication Data
US 2020/0322678 A1 Oct. 8, 2020

Related U.S. Application Data (63) Continuation of application No. PCT/CN2019/077264, filed on Mar. 7, 2019.

(30) Foreign Application Priority Data

Mar. 8, 2018 (CN) .......................... 201810190455.2

(51) Int. Cl.
H04N 21/2547 (2011.01)
H04N 21/262 (2011.01)
(Continued)

(52) U.S. Cl.
CPC ..... *H04N 21/44016* (2013.01); *G11B 27/036* (2013.01); *H04N 21/4586* (2013.01);
(Continued)

(58) Field of Classification Search
CPC .............................................. H04N 21/44016
See application file for complete search history.

(56) References Cited

U.S. PATENT DOCUMENTS 8,752,085 B1  6/2014 Brueck et al.
10,390,109 B2 * 8/2019 Young ................ H04N 21/8133
(Continued)

FOREIGN PATENT DOCUMENTS

CN  101448138 A  6/2009
CN  101557464 A  10/2009
(Continued)

OTHER PUBLICATIONS

International Search Report dated May 15, 2019 in PCT/CN2019/077264 (with English-language translation), citing documents AO-AT therein (6 pages).
(Continued)

*Primary Examiner* — Hsiungfei Peng
*Assistant Examiner* — Fred Peng
(74) *Attorney, Agent, or Firm* — Arentfox Schiff LLP (57) ABSTRACT In order for a terminal to play a video, a first video file is obtained. The first video file is sliced to generate a plurality of first slice files. A play index is generated to include entries respectively corresponding to the first slice files. An entry corresponding to a second video file is inserted into the index between an entry corresponding to one first slice file and an entry corresponding to another first slice file in the play index. The first slice files are played in sequence according to the play index, and the second vide file is played after the one of the first slice files and before the other of the first slice files according to the play index.

20 Claims, 6 Drawing Sheets (51) Int. Cl.
*H04N 21/2668* (2011.01)
*H04N 21/442* (2011.01)
*H04N 21/845* (2011.01)
*G06Q 30/02* (2012.01)
*H04N 21/44* (2011.01)
*G11B 27/036* (2006.01)
*H04N 21/458* (2011.01)
*H04N 21/472* (2011.01)
*H04N 21/482* (2011.01)
*H04N 21/81* (2011.01)

(52) U.S. Cl.
CPC ... *H04N 21/47217* (2013.01); *H04N 21/4825* (2013.01); *H04N 21/812* (2013.01); *H04N 21/8193* (2013.01)

(56) References Cited

U.S. PATENT DOCUMENTS

| | | | |
|---|---|---|---|
| 2006/0282864 A1* | 12/2006 | Gupte | H04N 21/25816 725/89 |
| 2014/0149210 A1 | 5/2014 | Ma et al. | |
| 2014/0150019 A1* | 5/2014 | Ma | H04L 65/602 725/34 |
| 2014/0259048 A1 | 9/2014 | Brueck et al. | |
| 2015/0020095 A1 | 1/2015 | Yoo et al. | |
| 2018/0189398 A1* | 7/2018 | Sternberg | G06Q 30/0272 |
| 2019/0141406 A1* | 5/2019 | Casagrande | H04N 21/4348 |

FOREIGN PATENT DOCUMENTS

| | | |
|---|---|---|
| CN | 102186109 | 9/2011 |
| CN | 103414940 A | 11/2013 |
| CN | 103607649 | 2/2014 |
| CN | 103618920 A | 3/2014 |
| CN | 103686255 A | 3/2014 |
| CN | 104135678 | 11/2014 |
| CN | 104394443 | 3/2015 |
| CN | 105049896 | 11/2015 |
| CN | 105072462 A | 11/2015 |
| CN | 105208465 | 12/2015 |
| CN | 105898376 | 8/2016 |
| CN | 105959746 A | 9/2016 |
| CN | 106210809 A | 12/2016 |
| CN | 107205177 | 9/2017 |
| CN | 107690084 | 2/2018 |

OTHER PUBLICATIONS

Written Opinion dated May 15, 2019, in PCT/CN2019/077264 (3 pages).
Chinese Office Action dated Mar. 24, 2021 in Chinese Application No. 201810190455.2 (with Concise English Translation).
Chinese Office Action dated Dec. 23, 2021 in Chinese Application No. 201810190455.2 with English translation, citing documents AO-AR therein, 10 pgs.

* cited by examiner

VIDEO PLAY METHOD AND APPARATUS, AND DEVICE

RELATED APPLICATION

This application is a continuation of International Application No. PCT/CN2019/077264, filed on Mar. 7, 2019, which claims priority to Chinese Patent Application No. 201810190455.2, entitled "VIDEO PLAY METHOD AND APPARATUS, AND DEVICE" filed on Mar. 8, 2018. The entire disclosures of the prior applications are hereby incorporated by reference in their entirety.

FIELD OF THE TECHNOLOGY

Exemplary embodiments of this application relate to the field of Internet technologies.

BACKGROUND OF THE DISCLOSURE

Creative insert advertisements have become quite eye-catching on video platforms. Specifically, in a particular scene design, a character in a drama plays a commercial through a sitcom to promote a selling point of a product in a warm, funny, or brainwashing manner. This allows a viewer to easily memorize a product function, thereby achieving an effect of product recommendation.

In a related implementation solution of a creative insert advertisement, the creative insert advertisement is used as a part of video content. That is, in addition to the video content, a video file further includes a creative insert advertisement inserted into the video content. This related implementation solution has a disadvantage that the creative insert advertisement is not easy to replace, and replacement costs are high as a completely new video file needs to be generated.

In other related art, a technical solution for playing the creative insert advertisement is provided to overcome the disadvantage in the related implementation solution described above. This technical solution is implemented by using two players. A first player plays video content. When a creative insert advertisement needs to be played, the first player suspends playing of the video content, and a second player is invoked to play the creative insert advertisement. After playing of the advertisement ends, the first player continues to play the video content. Although this solution overcomes the disadvantage of the related implementation solution, there may be problems such as picture freezing and blank screen.

SUMMARY

Exemplary embodiments of this application provide a video play method and apparatus, and a device as described below.

According to exemplary aspects, a video play method, performed by a terminal, includes obtaining, by circuitry, a first video file, and slicing, by the circuitry, the first video file to generate n first slice files, where n is an integer greater than 1. The method includes generating, by the circuitry, a play index, the play index including entries respectively corresponding to the n first slice files. The method also includes inserting, by the circuitry and between an entry corresponding to the $i^{th}$ first slice file and an entry corresponding to the $(i+1)^{th}$ first slice file in the play index, an entry corresponding to a second video file, i being a positive integer less than n. The method further includes playing, by the circuitry, the first slice files in sequence according to the play index, and playing, by the circuitry, the second video file after the $i^{th}$ first slice file according to the play index.

According to exemplary aspects, playing the second video file includes loading a preset plug-in, playing the second video file by using the preset plug-in, and displaying, by using the preset plug-in to play the second video file, a user interface (UI) element related to the second video file.

According to exemplary aspects, the UI element includes at least one of a countdown control or a click-for-detail control.

According to exemplary aspects, the video play method further includes transmitting a play status of the second video file to a third-party monitoring address corresponding to the second video file.

According to exemplary aspects, the video play method further includes, after playing the second video file, adjusting, in a case that a control instruction corresponding to a play progress is obtained during playing of the second video file, the play progress according to the control instruction.

According to exemplary aspects, the video play method further includes, before generating the play index, obtaining related information of a current login account, where the related information of the current login account includes at least one of identification information of the first video file, gender, region, age, preference, or a historical play record corresponding to the current login account. The method also includes, before generating the play index, transmitting the related information of the current login account to a server, and receiving related information, transmitted by the server, of the second video file matching the related information of the current login account. The related information of the second video file includes at least one of an insert timestamp, duration, a file address, a link address, or a third-party monitoring address.

According to exemplary aspects, the second video file is selected based on the related information of the current login account and the related information of the second video file, and the second video file is a creative insert advertisement.

According to exemplary aspects, the video play method further includes slicing the second video file to generate m second slice files, m being a positive integer greater than 1. The inserting, between the entry corresponding to the $i^{th}$ first slice file and the entry corresponding to the $(i+1)^{th}$ first slice file in the play index, the entry corresponding to a second video file, includes inserting, between the entry corresponding to the $i^{th}$ first slice file and the entry corresponding to the $(i+1)^{th}$ first slice file in the play index, entries respectively corresponding to the m second slice files, each of the m entries recording address information and duration of a corresponding second slice file.

According to exemplary aspects, the video play method further includes playing k consecutive or non-consecutive second slice files, k being a positive integer less than m.

According to exemplary aspects, a video play apparatus includes circuitry that obtains a first video file, and slices the first video file to generate n first slice files, where n is an integer greater than 1. The circuitry also generates a play index. The play index includes entries respectively corresponding to the n first slice files. The circuitry further inserts, between an entry corresponding to the $i^{th}$ first slice file and an entry corresponding to the $(i+1)^{th}$ first slice file in the play index, an entry corresponding to a second video file, where i is a positive integer less than n. Then the circuitry plays the first slice files in sequence according to the play index, and plays the second video file after the $i^{th}$ first slice file according to the play index.

According to exemplary aspects, a video play system includes a first server configured to store a first video file, a second server configured to store a second video file, and a computer device. The computer device includes circuitry configured to obtain the first video file from the first server, obtain the second vide file from the second server, and slice the first video file to generate n first slice files, where n is an integer greater than 1. The circuitry is also configured to generate a play index including entries respectively corresponding to the n first slice files, and insert, between an entry corresponding to the $i^{th}$ first slice file and an entry corresponding to the $(i+1)^{th}$ first slice file in the play index, an entry corresponding to the second video file, where i is a positive integer less than n. The circuitry is further configured to play the first slice files in sequence according to the play index, and play the second video file after the $i^{th}$ first slice file and before the $(i+1)^{th}$ first slice file according to the play index.

According to exemplary aspects, the processor performs a method that further includes loading a preset plug-in, playing the second video file by using the preset plug-in, and displaying, by using the preset plug-in to play the second video file, a user interface (UI) element related to the second video file.

According to exemplary aspects, the UI element includes at least one of a countdown control or a click-for-detail control.

According to exemplary aspects, the processor performs a method that further includes transmitting a play status of the second video file to a third-party monitoring address corresponding to the second video file.

According to exemplary aspect, the processor performs a method that further includes adjusting, in a case that a control instruction corresponding to a play progress is obtained in the process of playing the second video file, the play progress according to the control instruction.

According to exemplary aspects, the processor performs a method that further includes obtaining related information of a current login account. The related information of the current login account includes at least one of identification information of the first video file, gender, region, age, preference, or a historical play record corresponding to the current login account. The method includes transmitting the related information of the current login account to a server, and receiving related information, transmitted by the server, of the second video file matching the related information of the current login account. The related information of the second video file includes at least one of an insert timestamp, duration, a file address, a link address, or a third-party monitoring address.

According to exemplary aspects, the second video file is selected based on the related information of the current login account and the related information of the second video file, and the second video file is a creative insert advertisement.

According to exemplary aspects, the processor performs a method that further includes slicing the second video file to generate m second slice files, where m is a positive integer greater than 1. The method also includes inserting, between the entry corresponding to the $i^{th}$ first slice file and the entry corresponding to the $(i+1)^{th}$ first slice file in the play index, entries respectively corresponding to the m second slice files. Each of the m entries record address information and duration of a corresponding second slice file.

According to exemplary aspects, the processor performs a method that further includes playing k consecutive or non-consecutive second slice files, where k is a positive integer less than m.

According to exemplary aspects, a non-transitory computer-readable storage medium stores computer-readable instructions that, when executed by a processor, cause the processor to perform the a method that includes obtaining, by circuitry, a first video file, and slicing, by the circuitry, the first video file to generate n first slice files, where n is an integer greater than 1. The method includes generating, by the circuitry, a play index, the play index including entries respectively corresponding to the n first slice files. The method also includes inserting, by the circuitry and between an entry corresponding to the $i^{th}$ first slice file and an entry corresponding to the $(i+1)^{th}$ first slice file in the play index, an entry corresponding to a second video file, i being a positive integer less than n. The method further includes playing, by the circuitry, the first slice files in sequence according to the play index, and playing, by the circuitry, the second video file after the $i^{th}$ first slice file according to the play index.

BRIEF DESCRIPTION OF THE DRAWINGS

Referring now to the drawings, wherein like reference numerals designate identical or corresponding parts throughout the several views.

DETAILED DESCRIPTION

The following further describes the exemplary embodiments of the present disclosure in detail with reference to the accompanying drawings.

Figure 1A:
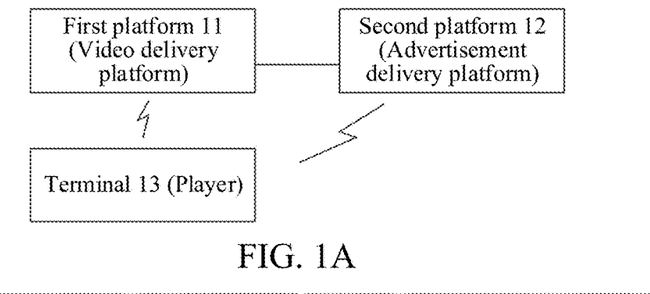
FIG. 1A is a schematic diagram of an implementation environment according to an exemplary embodiment of the present disclosure.

FIG. 1A is a schematic diagram of an implementation environment according to an exemplary embodiment of the present disclosure. The implementation environment may include: a first platform 11, a second platform 12, and a terminal 13.

The first platform 11 provides a first video file. The first video file may be content such as a movie, a TV series, a variety show, and an animation. As shown in FIG. 1A, the first platform 11 may also be referred to as a "video delivery platform".

The second platform 12 provides a second video file. Content of the second video file may be an advertisement or the content of the second video file may be a creative insert advertisement. As shown in FIG. 1A, the second platform 12 may also be referred to as an "advertisement delivery platform". An advertiser may access the second platform 12, and publish a to-be-delivered advertisement to the second platform 12.

The first platform 11 and the second platform 12 may be two independent platforms, or may be a unified platform functionally integrated. The first platform 11 and the second platform 12 may be implemented by a server, a server cluster, or a cloud computing service center.

The terminal 13 may be any electronic device having a video play function, for example, a mobile phone, a tablet computer, a multimedia playback device, a personal computer (PC), and a television. A software program having a video play function may be installed and run in the terminal 13, which may be referred to as a video player ("player" for short hereinafter) or a video client. The terminal 13 may establish a communications connection to each of the first platform 11 and the second platform 12, to obtain the first video file from the first platform 11 and the second video file from the second platform 12. The communications connection may be established in a wired or wireless network manner.

Figure 1B:
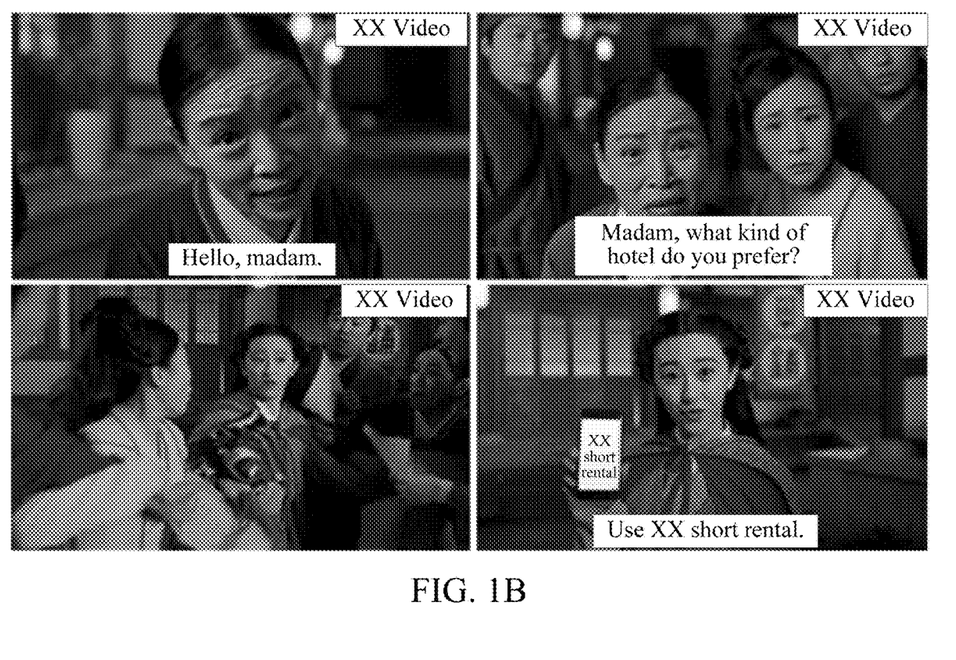
FIG. 1B is a schematic diagram illustrating a creative insert advertisement according to an exemplary embodiment of the present disclosure.

In this exemplary embodiment of the present disclosure, the creative insert advertisement is an advertisement played by a character in a drama through a sitcom. Generally, a director, an actor, and a videographer of the creative insert advertisement belong to a production team of the drama, and a scene is also the same as or similar to a scene in the play. Even the clothing used in the advertisement is the same or similar to that in the drama as far as possible. The creative insert advertisement is integrated into the video content, which minimizes dislike and resistance of a viewer in watching the advertisement and improves acceptance of the viewer for an advertised product through interesting arrangements. For example, FIG. 1B is a schematic diagram of a creative insert advertisement. A product promoted in the advertisement is an "XX short rental" application (APP). Actors of the advertisement belong to a production team of a drama. A scene and clothing are both the same as or similar to those in the drama.

Figure 2:
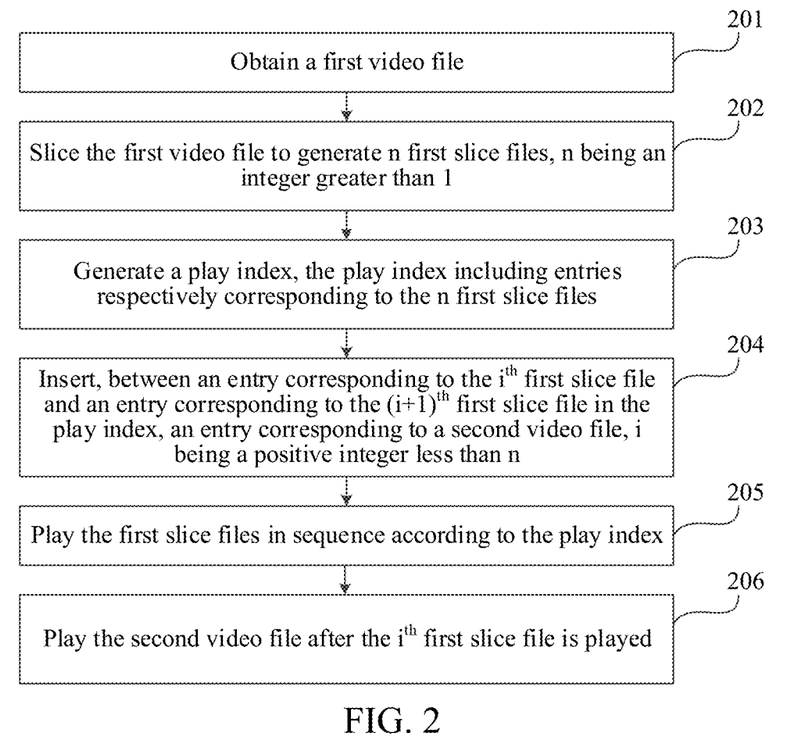
FIG. 2 is a flowchart of a video play method according to an exemplary embodiment of the present disclosure.

FIG. 2 is a flowchart of a video play method according to an exemplary embodiment of the present disclosure. The method may be applied to the terminal 13 in the implementation environment shown in FIG. 1A, for example, applied to a player. The method may include the following steps.

In step 201, a first video file is obtained.

The player obtains the first video file. The player requests, from the first platform 11 according to a play request of a user, the first video file conforming to the play request. For example, the player obtains a play request of a user for an episode 1 of an xx TV series, and requests a video file of the episode 1 of the xx TV series from the first platform 11.

In this exemplary embodiment of the present disclosure, an encapsulation format of the first video file is not limited. For example, the encapsulation format may be a transport stream (TS) format. In addition, in this exemplary embodiment of the present disclosure, an audio/video coding format used for the first video file is not limited either. For example, the video coding format may be an H.264 format, and the audio coding format may be a format such as moving picture experts group audio layer III (MP3), advanced audio coding (AAC), Dolby surround audio coding-3 (AC-3).

In step 202, the first video file is sliced to generate n first slice files, n being an integer greater than 1.

The slicing is performed by using a multimedia video processing tool Fast Forward Mpeg (FFmpeg). Duration of the first slice files may be the same or may be different. The duration of each first slice file may be preset to, for example, 10 seconds, 20 seconds, or 30 seconds. Each first slice file has a corresponding file name.

In step 203, a play index is generated. The play index includes entries respectively corresponding to the n first slice files.

The play index includes n entries, and the n entries and the n first slice files are in a one-to-one correspondence. Each of the n entries may record address information (for example, a file name) and duration of a first slice file. An arrangement sequence of the n entries in the play index is consistent with a play sequence of the n first slice files. A first slice file corresponding to the first entry in the sequence is played first. After a first slice file corresponding to an entry is played, a first slice file corresponding to a next entry is played immediately.

Figure 3A:
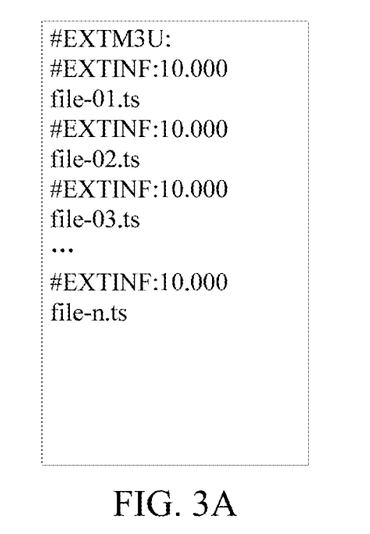
FIG. 3A is a schematic diagram illustrating a play index according to an exemplary embodiment of the present disclosure.

The play index may be a moving picture experts group audio layer 3 uniform resource locator 8 (M3U8) file. For example, as shown in FIG. 3A, entries shown in the figure are recorded in the M3U8 file, and each entry corresponds to a first slice file whose duration is 10 seconds.

In step 204, an entry corresponding to a second video file is inserted between an entry corresponding to the $i^{th}$ first slice file and an entry corresponding to the $(i+1)^{t}$ first slice file in the play index, where i is a positive integer less than n.

Content of the second video file is an advertisement. For example, the content of the second video file is a creative insert advertisement.

The player inserts the second video file between two adjacent first slice files. An insert location of the second video file may be determined by the player according to a predefined policy, or may be determined by the player according to an insert timestamp of the second video file. The insert timestamp of the second video file may be preset by a publisher of the second video file or the second platform 12.

In an example, the player determines, according to the insert timestamp of the second video file, the insert location of the entry corresponding to the second video file in the play index. Each first slice file includes a start play timestamp and an end play timestamp. The start play timestamp is a timestamp at which the first slice file starts to be played, and the end play timestamp is a timestamp at which playing of the first slice file is completed. A difference between the end play timestamp and the start play timestamp is the duration of the first slice file. An end play timestamp of the $i^{th}$ first slice file is a start play timestamp of the $(i+1)^{th}$ first slice file. A start play timestamp of the $1^{st}$ first slice file may be a preset value, for example, 0. If the insert timestamp of the second video file is an end play timestamp of a first slice file, the player inserts the entry corresponding to the second video file behind an entry corresponding to the first slice file. For example, if the insert timestamp of the second video file is the end play timestamp of the $i^{th}$ first slice file, the player inserts the entry corresponding to the second video file between the entry corresponding to the $i^{th}$ first slice file and the entry corresponding to the $(i+1)^{th}$ first slice file. If the insert timestamp of the second video file is greater than a start play timestamp of a first slice file but is less than an end play timestamp of the first slice file, the player may insert the entry corresponding to the second video file before the entry corresponding to the first slice file, or may insert the entry corresponding to the second video file behind the entry corresponding to the first slice file. For example, if the insert timestamp of the second video file is greater than a start play timestamp of the $i^{th}$ first slice file, but is less than the end play timestamp of the $i^{th}$ first slice file, the player may insert the entry corresponding to the second video file between an entry corresponding to the $(i-1)^{th}$ first slice file and the entry corresponding to the $i^{th}$ first slice file, or may insert the entry corresponding to the second video file between the entry corresponding to the $i^{th}$ first slice file and the entry corresponding to the $(i+1)^{th}$ first slice file.

Figure 3B:
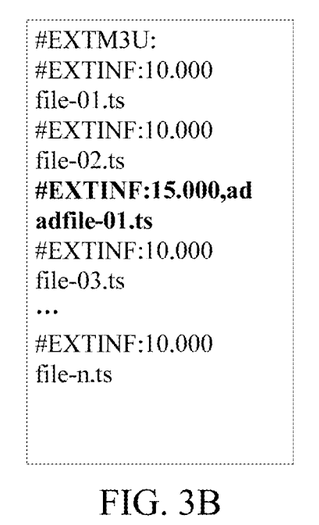
FIG. 3B is a schematic diagram illustrating a play index according to an exemplary embodiment of the present disclosure.

The entry corresponding to the second video file may record address information (for example, a file name) and duration of the second video file. For example, as shown in FIG. 3B, in the M3U8 file, the entry corresponding to the second video file is inserted between an entry corresponding to the $2^{nd}$ first slice file and an entry corresponding to the $3^{rd}$ first slice file, including the address information and the duration of the second video file.

The entry corresponding to the first slice file further includes a first identifier, and/or the entry corresponding to the second video file further includes a second identifier. The first identifier and the second identifier are used for distinguishing the first slice file and the second video file.

If the duration of the second video file is relatively long, the player may further slice the second video file to generate m second slice files, m being an integer greater than 1. Duration of the second slice files may be the same or may be different. The duration of each second slice file may be preset to, for example, 10 seconds, 20 seconds, or 30 seconds. In addition, the duration of the second slice file and the duration of the first slice file may be the same or may be different. Each second slice file has a corresponding file name. When the second video file is sliced into m second slice files, the player inserts, between the entry corresponding to the $i^{th}$ first slice file and the entry corresponding to the $(i+1)^{th}$ first slice file in the play index, entries respectively corresponding to the m second slice files. The m entries and the m second slice files are in a one-to-one correspondence. Each of the m entries may record address information (for example, a file name) and duration of a second slice file. An arrangement sequence of the m entries in the play index is consistent with a play sequence of the m second slice files. A second slice file corresponding to the first entry in the sequence is played first. After a second slice file corresponding to an entry is played, the second slice file corresponding to a next entry is played immediately.

The player may request the second video file from the second platform 12.

In an example, the player further performs the following steps to obtain related information of the second video file.

In a first step, the player obtains related information of a current login account.

The current login account is a user account that currently logs in to the player. The related information of the current login account includes at least one of the following: identification information (for example, a file name) of the first video file, and gender, region, age, preference, and a historical play record corresponding to the current login account.

In a second step, the player transmits the related information of the current login account to a server.

The server is a server of the second platform 12. After receiving the related information of the current login account, the server searches for and obtains the second video file matching the related information of the current login account.

When submitting the second video file to the second platform 12, a publisher of the second video file also submits a push condition of the second video file. For example, the push condition includes at least one of the following: the identification information of the first video file associated with the second video file, and gender, region, age, and preference targeted by the second video file. The second platform 12 stores the second video file and the push condition of the second video file after the second video file is approved.

In an example, the related information of the current login account transmitted by the player to the server includes: xx TV series, female, and Shanghai. The server searches for and obtains the second video file matching the related information of the current login account, and transmits the second video file to the player. There may be one or more second video files matching the related information of the current login account, which is not limited in this embodiment of this application.

In a third step, the player receives related information, transmitted by the server, of the second video file matching the related information of the current login account.

The related information of the second video file includes at least one of the following: the insert timestamp, the duration, a file address, a link address, and a third-party monitoring address. The file address of the second video file is a download address of the second video file, and is used for the player to download and obtain the second video file. The link address of the second video file is an address of a link page related to the second video file, which may be a web page address, for example, a uniform resource locator (URL). When the content of the second video file is an advertisement, the link address may be a web page address of detail, purchase, or other pages of a product recommended in the advertisement. The third-party monitoring address is an address for the player to report a play status of the second video file. The play status may be information such as whether the second video file is played, whether the second video file is played completely, and whether the second video file is repeatedly played.

Figure 4:
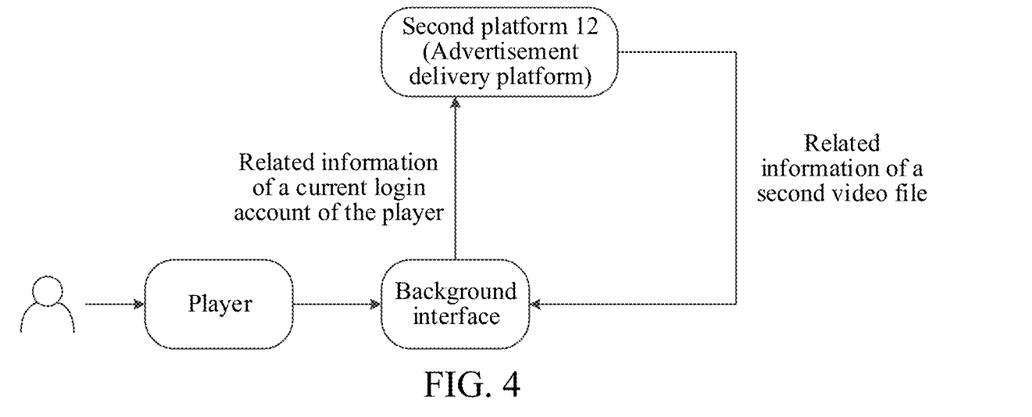
FIG. 4 is a schematic interaction diagram illustrating a player obtaining a second video file according to an exemplary embodiment of the present disclosure.

FIG. 4 is a schematic interaction diagram of the player obtaining the second video file. The user at a player end requests to play the first video file. The player transmits, through a background interface, the related information of the current login account to the second platform 12 (for example, the advertisement delivery platform). For example, the related information of the current login account may include the identification information (for example, the file name) of the first video file, and the gender, region, age, preference, and historical play record corresponding to the current login account. The second platform 12 screens out the second video file matching the related information of the current login account, and transmits the related information of the second video file to the player. For example, the related information of the second video file may include information such as the insert timestamp, the duration, the file address, the link address, and the third-party monitoring address.

In step 205, the first slice files in sequence is played according to the play index.

The player plays files in sequence according to the entries recorded in the play index, which include the first slice files and the second video file (or the second slice files). The player may obtain, according to address information recorded in an entry, a corresponding file and play the file. When playing a file corresponding to a current entry, the player asynchronously parses a next entry and obtains a file corresponding to the next file, to rapidly start to play the file corresponding to the next entry after the file corresponding to the current entry is played.

In step 206, the second video file is played after the $i^{th}$ first slice file is played.

After the $i^{th}$ first slice file is played, the player plays the second video file. After the second video file is played, the player plays the $(i+1)^{th}$ first slice file.

For example, for entries recorded in the M3U8 file shown in FIG. 3B, the player first reads the first entry, obtains the $1^{st}$ first slice file according to address information of the $1^{st}$ first slice file recorded in the first entry, and then plays the $1^{st}$ first slice file. After the $1^{st}$ first slice file is played, the player continues to play the $2^{nd}$ first slice file. After the $2^{nd}$ first slice file is played, the player plays the second video file. Then, after the second video file is played, the player plays the $3^{rd}$ first slice file, and so on.

The player plays the second video by loading a preset plug-in. The preset plug-in is an advertisement plug-in, which is a plug-in specially used for playing an advertisement. The player plays the second video file with the preset plug-in, and displays a user interface (UI) element related to the second video file while playing the second video file with the preset plug-in.

The UI element includes at least one of the following: a countdown control and a click-for-detail control. For example, the preset plug-in can display the UI element above a content interface of the second video file. The countdown control is configured to indicate remaining duration of the second video file. The click-for-detail control is an operation control configured to trigger display of details of a product. After obtaining a trigger instruction corresponding to the click-for-detail control, the player displays a corresponding link page according to the link address of the second video file.

Figure 5:
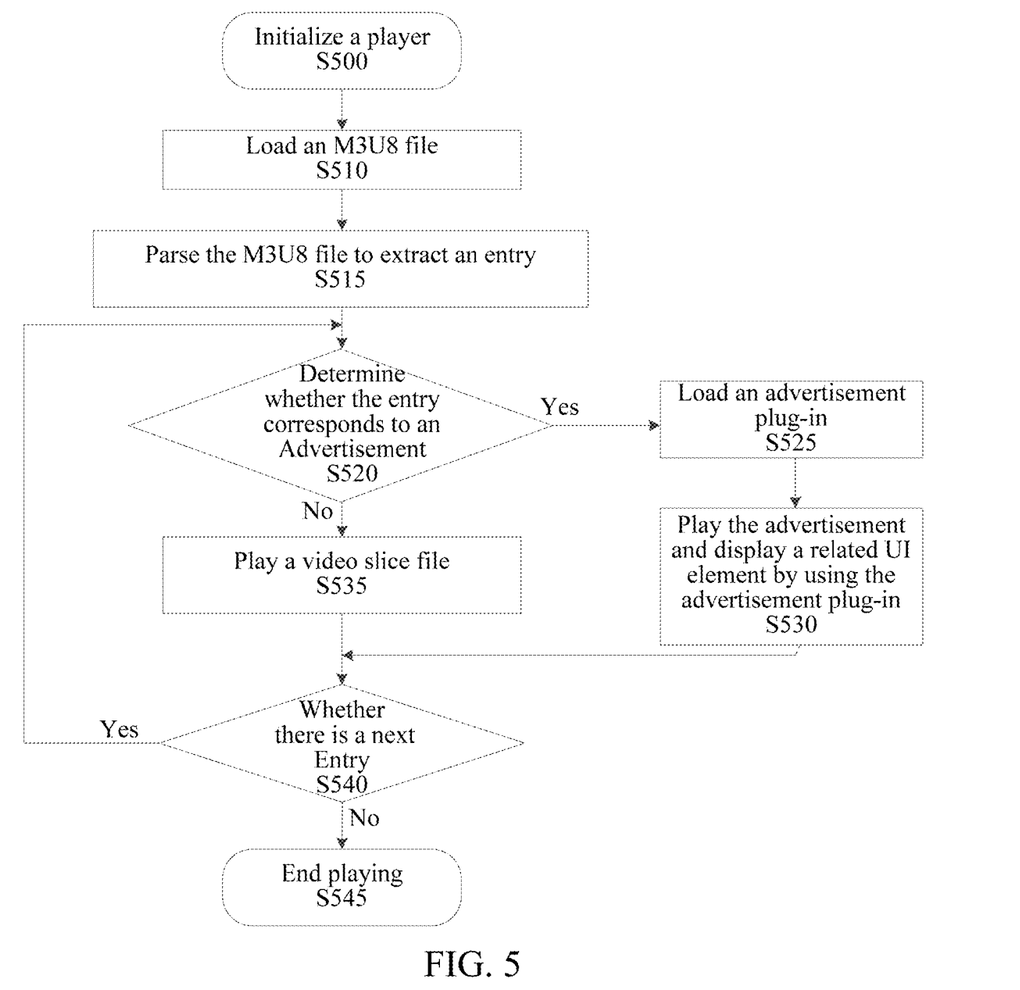
FIG. 5 is a schematic diagram illustrating processing logic of a player according to an exemplary embodiment of the present disclosure.

FIG. 5 shows processing logic of playing a video by a player. The player is initialized (S500), an M3U8 file is loaded (S510), the M3U8 file is parsed, and a current entry is extracted (S515), and whether the current entry corresponds to an advertisement is determined (S520). If yes, an advertisement plug-in is loaded (S525), the advertisement is played and a related UI element is displayed by using the advertisement plug-in (S530). If no, a video slice file is played (S535). Then whether there is a next entry is determined (S540), and if yes, the process reverts to S520. Otherwise, the process ends (S545)

In addition, the player may further obtain a play status of the second video file and transmit the play status of the second video file to the third-party monitoring address corresponding to the second video file. In the foregoing manner, a third party (for example, an advertiser) can perform statistical analysis on the play status of the second video file to learn a delivery effect of the second video file.

In a case that a control instruction corresponding to a play progress is obtained in the process of playing the second video file, the player adjusts the play progress according to the control instruction. For example, when the control instruction is a slide or click/tap operation instruction corresponding to a play progress bar, the player determines an adjusted-to play timestamp according to the control instruction, and then starts to play the video from the adjusted-to play timestamp. In the foregoing manner, a user is allowed to adjust the play progress in the process of playing the second video file, control on the play progress is more flexible, and the user may also choose to skip the advertisement to continue to play the video.

For example, as described above, the second video file is sliced into m second slice files, m being a positive integer greater than 1. The player inserts, between the entry corresponding to the $i^{th}$ first slice file and the entry corresponding to the $(i+1)^{t}$ first slice file in the play index, entries respectively corresponding to the m second slice files. In a case that a control instruction corresponding to the play progress is obtained in the process of playing the second video file, the player adjusts the play progress according to the control instruction, and may choose to play k second slice files, k being a positive integer less than m. The k second slice files may be k consecutive second slice files, or may be k non-consecutive second slice files, which is not limited in this embodiment.

Figure 6:
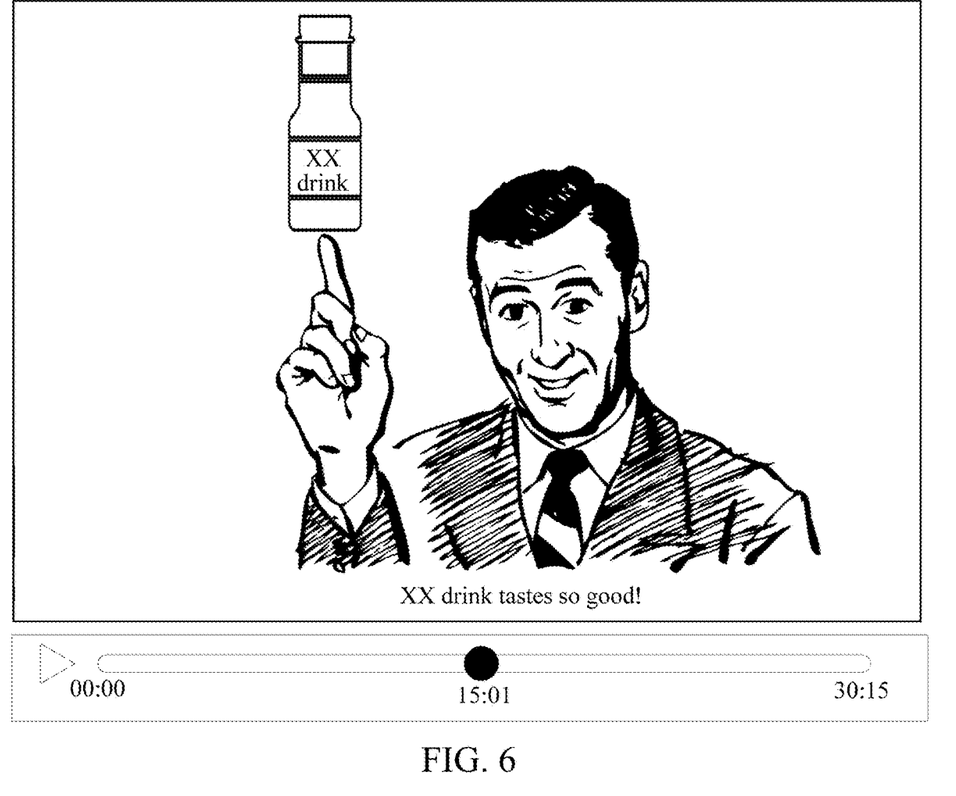
FIG. 6 is a schematic diagram illustrating a video play interface according to an exemplary embodiment of the present disclosure.

FIG. 6 is a schematic diagram of a creative insert advertisement. A product promoted in the advertisement is an XX drink. Duration of the creative insert advertisement is 15 seconds, and the creative insert advertisement is inserted at a location of 15:00 to 15:15 in a TV episode whose duration is 30 minutes. When playing the video file to 15:00, the player starts to play the creative insert advertisement. In a process of playing the creative insert advertisement, a user may choose to suspend playing, or may drag a progress bar to adjust a play progress.

Thus, in the exemplary embodiment of the present disclosure described above, the first video file is sliced into a plurality of first slice files, and the entry corresponding to the second video file is inserted between entries corresponding to two adjacent first slice files in the play index. In this way, the first slice files and the second video file can be played by using only one player in sequence instead of playing the second video file by using an additional player, thereby avoiding a problem of picture freezing or blank screen. Moreover, it is convenient to replace the second video file which is inserted into the first video file according to the play index.

In addition, in the solutions provided in this exemplary embodiment of the present disclosure, the second video file may be clicked/tapped to trigger detail presentation, third-party monitoring may be implemented, and the progress may be adjusted, bringing abundant functions and good play experience.

The following is an exemplary apparatus embodiment of the present disclosure, which can be used to execute the exemplary method embodiments of the present disclosure. For details not disclosed in the following exemplary apparatus embodiment, refer to the exemplary method embodiments of the present disclosure.

Figure 7:
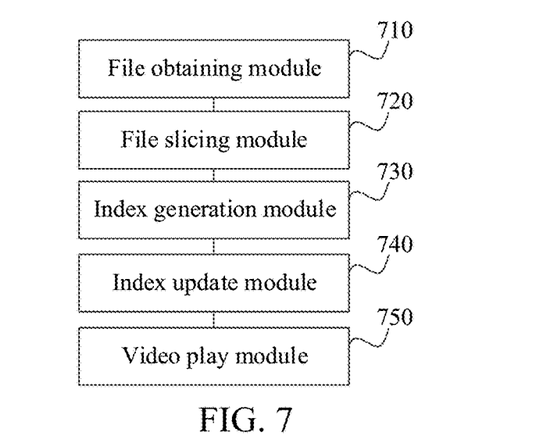
FIG. 7 is a block diagram of a video play apparatus according to an exemplary embodiment of the present disclosure.

FIG. 7 is a block diagram of a video play apparatus according to an exemplary embodiment of the present disclosure. The apparatus has functions that implement the foregoing method examples. The functions may be implemented by using hardware circuitry, or may be implemented by hardware circuitry executing corresponding software. The apparatus may include: a file obtaining module 710, a file slicing module 720, an index generation module 730, an index update module 740, and a video play module 750.

The file obtaining module 710 is configured to obtain a first video file.

The file slicing module 720 is configured to slice the first video file to generate n first slice files, n being an integer greater than 1.

The index generation module 730 is configured to generate a play index, the play index including entries respectively corresponding to the n first slice files.

The index update module 740 is configured to insert, between an entry corresponding to the $i^{th}$ first slice file and an entry corresponding to the $(i+1)^{th}$ first slice file in the play index, an entry corresponding to a second video file, i being a positive integer less than n.

The video play module 750 is configured to play the first slice files in sequence according to the play index.

The video play module 750 is further configured to play the second video file after the $i^{th}$ first slice file is played.

Thus, in this exemplary embodiment, the first video file is sliced into a plurality of first slice files, and the entry corresponding to the second video file is inserted between entries corresponding to two adjacent first slice files in the play index. In this way, the first slice files and the second video file can be played by using only one player in sequence instead of playing the second video file by using an additional player, thereby avoiding a problem of picture freezing or blank screen. Moreover, it is convenient to replace the second video file which is inserted into the first video file based on the play index.

In an exemplary embodiment based on the exemplary embodiment in FIG. 7, the video play module 750 loads a preset plug-in, and plays the second video file with the present plug-in. The video player displays a user interface (UI) element related to the second video file while playing the second video file with the preset plug-in. The UI element includes at least one of the following: a countdown control and a click-for-detail control.

In an exemplary embodiment based on the exemplary embodiment in FIG. 7, the apparatus further includes an information reporting module.

The information reporting module is configured to transmit a play status of the second video file to a third-party monitoring address corresponding to the second video file.

In an exemplary embodiment based on the exemplary embodiment in FIG. 7, the apparatus further includes a progress adjustment module.

The progress adjustment module is configured to adjust, in a case that a control instruction corresponding to a play progress is obtained in the process of playing the second video file, the play progress according to the control instruction.

In an exemplary embodiment based on the exemplary embodiment in FIG. 7, the file obtaining module 710 obtains related information of a current login account. The related information of the current login account includes at least one of identification information of the first video file, a gender, region, age, preference, and historical play record corresponding to the login account. The obtaining module 170 transmits the related information of the current login account to a server, and receives related information, from the server, of the second video file matching the related information of the current login account. The related information of the second video file includes at least an insert timestamp, duration, a file address, a link address, and a third-party monitoring address.

In the above description of the apparatus according to an exemplary embodiment, the functions performed thereby are divided among several modules. However, this division is purely for the sake of clarity in explaining the features of the present disclosure. As can be appreciated, the functions may be allocated to and completed by different function modules according to requirements, or may otherwise be grouped and performed by different modules, a different number of modules, or a single module without departing from the scope of the present disclosure. In addition, the apparatus and method embodiments provided in the foregoing embodiments are based on the same concepts, and reference can be made to the exemplary methods described above for any detail not specifically covered in the description of the apparatus.

Figure 8:
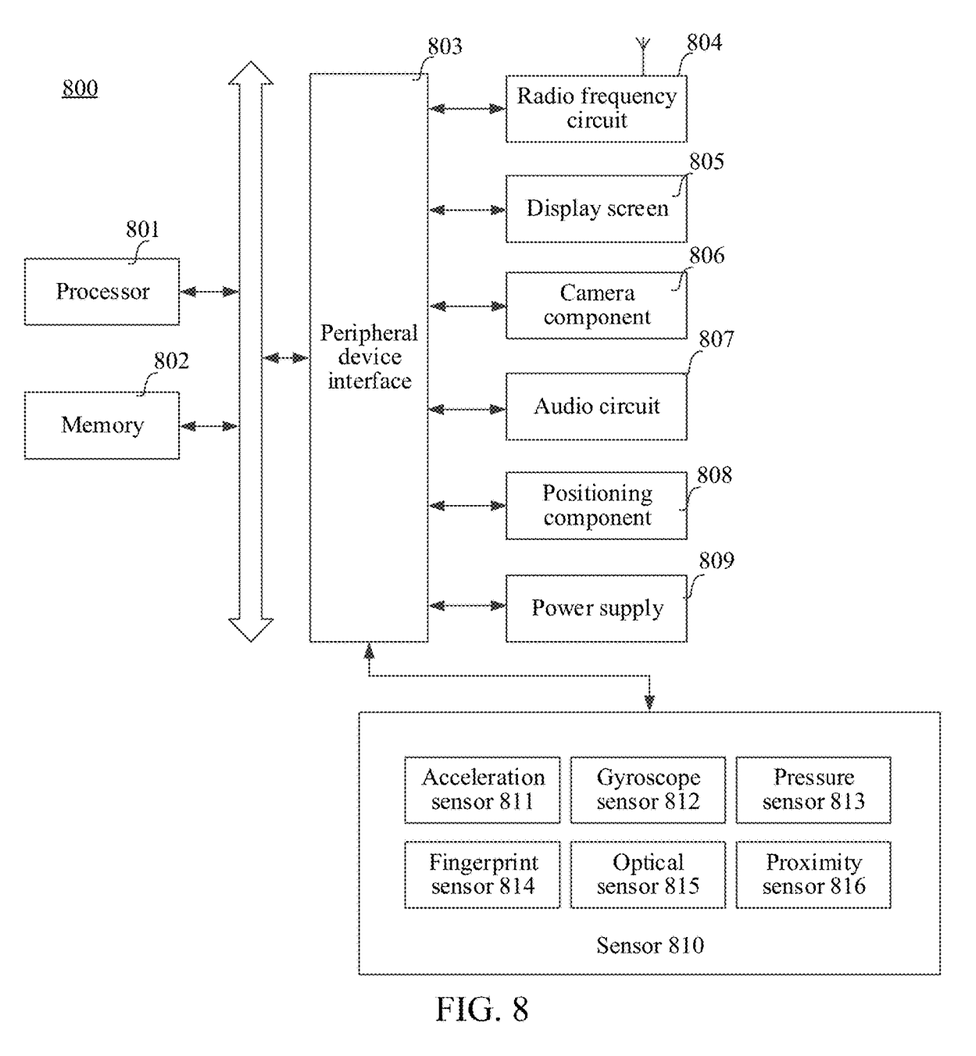
FIG. 8 is a structural block diagram of a computer device according to an exemplary embodiment of the present disclosure.

FIG. 8 is a structural block diagram of a computer device 800 according to an embodiment of this application. The computer device 800 may be a PC, a mobile phone, a tablet computer, a multimedia playback device, a wearable device, a television, or the like. The computer device may also be the apparatus described above.

Generally, the computer device 800 includes circuitry such as a processor 801 and a memory 802.

The processor 801 may include circuits such as one or more processing cores, which may be, for example, a 4-core processor or an 8-core processor. The processor 801 may be implemented in at least one hardware form of a digital signal processor (DSP), a field-programmable gate array (FPGA), and a programmable logic array (PLA). The processor 801 may also include a main processor and a coprocessor. The main processor is a processor configured to process data in an active state, and is also referred to as a central processing unit (CPU). The coprocessor is a low power consumption processor configured to process data in a standby state. In some embodiments, the processor 801 may be integrated with a graphics processing unit (GPU). The GPU is configured to be responsible for rendering and drawing content that a display screen needs to display. In some embodiments, the processor 801 may further include an artificial intelligence (AI) processor. The AI processor is configured to process a computing operation related to machine learning.

The memory 802 may include one or more computer-readable storage media. The computer-readable storage medium may be non-transitory. The memory 802 may further include a high-speed random access memory (RAM) and a non-volatile memory, for example, one or more magnetic disk storage devices or flash memory devices. In some embodiments, the non-transitory computer-readable storage medium in the memory 802 is configured to store at least one instruction. The at least one instruction is used for being executed by the processor 801 to implement the video play method provided in the method embodiments of this application.

In some embodiments, the computer device 800 further includes a peripheral device interface 803 and at least one peripheral device. The processor 801, the memory 802, and the peripheral device interface 803 may be connected by using a bus or a signal cable. Each peripheral device may be connected to the peripheral device interface 803 by using a bus, a signal cable, or a circuit board. Specifically, the peripheral device includes at least one of a radio frequency (RF) circuit 804, a display screen 805, a camera component 806, an audio circuit 807, a positioning component 808, and a power supply 809.

The peripheral device interface 803 may be configured to connect the at least one peripheral device related to input/output (I/O) to the processor 801 and the memory 802. In some embodiments, the processor 801, the memory 802, and the peripheral device interface 803 are integrated on the same chip or circuit board. In some other embodiments, any one or two of the processor 801, the memory 802, and the peripheral device interface 803 may be implemented on a single chip or circuit board. This is not limited in this disclosure. Thus, the implementation of the circuitry of the peripheral device interface described herein is merely exemplary, and other implementations are possible without departing from the scope of the present disclosure.

The RF circuit 804 is configured to receive and transmit an RF signal, which is also referred to as an electromagnetic signal. The RF circuit 804 communicates with a communications network and other communications devices by using the electromagnetic signal. The RF circuit 804 converts an electrical signal into an electromagnetic signal to be sent, or converts a received electromagnetic signal into an electrical signal. The RF circuit 804 includes: an antenna system, an RF transceiver, one or more amplifiers, a tuner, an oscillator, a DSP, a codec chip set, a subscriber identity module card, and the like. The RF circuit 804 may communicate with other devices through at least one wireless communications protocol. The wireless communications protocol includes, but is not limited to, a metropolitan area network, (2G, 3G, 4G, and 5G) mobile communications networks, a wireless local area network, and/or a WiFi network. In exemplary embodiments, the RF circuit 804 may also include a circuit related to near field communication (NFC). This is not limited in the present disclosure. Thus, numerous variations of the RF circuit 804 are possible without departing from the scope of the present disclosure.

The display screen 805 is configured to display a user interface (UI). The UI may include a graphic, a text, an icon, a video, and any combination thereof. When the display screen 805 is a touchscreen, the display screen 805 further has a capability of collecting a touch signal on or above a surface of the display screen 805. The touch signal may be input as a control signal to the processor 801 for processing. In this case, the display screen 805 may be further configured to provide a virtual button and/or a virtual keyboard, which is also referred to as a soft button and/or a soft keyboard. In some embodiments, there may be one display screen 805, disposed on a front panel of the computer device 800. In exemplary embodiments, there may be at least two display screens 805, disposed on different surfaces of the computer device 800 respectively or in a folded design. In exemplary embodiments, the display screen 805 may be a flexible display screen, disposed on a curved surface or a folded surface of the computer device 800. Even, the display screen 805 may be set in a non-rectangular irregular pattern, namely, a special-shaped screen. The display screen 805 may be made of a material such as a liquid crystal display (LCD) or an organic light-emitting diode (OLED).

The camera component 806 is configured to collect an image or a video. The camera component 806 includes a front-facing camera and a rear-facing camera. Generally, the front-facing camera is disposed on a front panel of the computer device, and the rear-facing camera is disposed on a back surface of the computer device. In some embodiments, there are at least two rear-facing cameras: a main camera and any one of a depth of field camera, a wide-angle camera, and a long-focus camera, to implement a background blurring function by fusing the main camera and the depth of field camera, or implement panoramic shooting and virtual reality (VR) shooting functions by fusing the main camera and the wide-angle camera, or another fusion-based shooting function. In some embodiments, the camera component 806 may further include a flash. The flash may be a monochrome temperature flash, or may be a double color temperature flash. The double color temperature flash refers to a combination of a warm light flash and a cold light flash, and may be used for light compensation at different color temperatures.

The audio circuit 807 may include a microphone and a speaker. The microphone is configured to collect a sound wave of a user and an environment, and convert the sound wave into the electrical signal to be input to the processor 801 for processing, or to be input to the RF circuit 804 for implementing voice communication. For the purpose of stereo collection or noise reduction, there may be a plurality of microphones, disposed at different portions of the computer device 800 respectively. The microphone may be further an array microphone or an omni-directional collection type microphone. The speaker is configured to convert the electrical signal from the processor 801 or the RF circuit 804 into the sound wave. The speaker may be a conventional film speaker, or may be a piezoelectric ceramic speaker. When the speaker is the piezoelectric ceramic speaker, the speaker not only can convert the electrical signal into a sound wave audible to a human being, but also can convert the electrical signal into a sound wave inaudible to the human being for ranging and the like. In some embodiments, the audio circuit 807 may alternatively include an earphone jack.

The positioning component 808 is a circuit configured to position a current geographic location of the computer device 800 for implementing navigation or a location based service (LBS). The positioning component 808 may be a positioning component based on a global positioning system (GPS) of the United States, a China's BeiDou Navigation Satellite System (BDS), a Grenas system of Russia, or a Galileo system of the European Union (EU).

The power supply 809 is configured to supply power for the components in the computer device 800. The power supply 809 may be an alternating current, a direct current, a disposable battery, or a rechargeable battery. When the power supply 809 includes the rechargeable battery, the rechargeable battery may support wired charging or wireless charging. The rechargeable battery may be further configured to support a fast charge technology.

In exemplary embodiments, the computer device 800 further includes one or more sensors 810. The one or more sensors 810 include, but are not limited to, an acceleration sensor 811, a gyroscope sensor 812, a pressure sensor 813, a fingerprint sensor 814, an optical sensor 815, and a proximity sensor 816.

The acceleration sensor 811 may detect the magnitude of acceleration on three coordinate axes of a coordinate system established with the computer device 800. For example, the acceleration sensor 811 may be configured to detect components of gravity acceleration on the three coordinate axes. The processor 801 may control, according to a gravity acceleration signal collected by the acceleration sensor 811, the display screen 805 to display the UI in a transverse view or a longitudinal view. The acceleration sensor 811 may be further configured to collect motion data of a game or a user.

The gyroscope sensor 812 may detect a body direction and a rotation angle of the computer device 800. The gyroscope sensor 812 may cooperate with the acceleration sensor 811 to collect a 3D action by the user on the computer device 800. The processor 801 may implement the following functions according to the data collected by the gyroscope sensor 812: motion sensing (such as changing the UI according to a tilt operation of the user), image stabilization at shooting, game control, and inertial navigation.

The pressure sensor 813 may be disposed at a side frame of the computer device 800 and/or a lower layer of the display screen 805. When the pressure sensor 813 is disposed at the side frame of the computer device 800, a holding signal of the user on the computer device 800 may be detected, and the processor 801 performs left/right hand identification or a quick operation according to the holding signal collected by the pressure sensor 813. When the pressure sensor 813 is disposed at the lower layer of the display screen 805, the processor 801 controls an operable control on the UI interface according to a pressure operation of the user on the display screen 805. The operable control includes at least one of a button control, a scroll-bar control, an icon control and a menu control.

The fingerprint sensor 814 is configured to collect a user's fingerprint, and the processor 801 identifies a user's identity according to the fingerprint collected by the fingerprint sensor 814, or the fingerprint sensor 814 identifies the user's identity according to the collected fingerprint. When identifying that the user's identity is a trusted identity, the processor 801 authorizes the user to perform related sensitive operations. The sensitive operations include: unlocking a screen, viewing encryption information, downloading software, paying, changing a setting, and the like. The fingerprint sensor 814 may be disposed on a front surface, a back surface, or a side surface of the computer device 800. When a physical button or a vendor logo is disposed on the computer device 800, the fingerprint sensor 814 may be integrated with the physical button or the vendor logo.

The optical sensor 815 is configured to collect ambient light intensity. In an exemplary embodiment, the processor 801 may control display brightness of the display screen 805 according to the ambient light intensity collected by the optical sensor 815. Specifically, when the ambient light intensity is relatively high, the display brightness of the display screen 805 is turned up. When the ambient light intensity is relatively low, the display brightness of the display screen 805 is turned down. In another embodiment, the processor 801 may further dynamically adjust a shooting parameter of the camera component 806 according to the ambient light intensity collected by the optical sensor 815.

The proximity sensor 816, also referred to as a distance sensor, is generally disposed on the front panel of the computer device 800. The proximity sensor 816 is configured to collect a distance between the user and the front surface of the computer device 800. In an exemplary embodiment, when the proximity sensor 816 detects that the distance between the user and the front surface of the computer device 800 gradually becomes smaller, the display screen 805 is controlled by the processor 801 to switch from a screen-on state to a screen-off state. When the proximity sensor 816 detects that the distance between the user and the front surface of the computer device 800 gradually becomes larger, the display screen 805 is controlled by the processor 801 to switch from the screen-off state to the screen-on state.

A person skilled in the art will recognize that the structure shown in FIG. 8 constitutes no limitation on the computer device 800, and the computer device may include more or fewer components than those shown in the figure, or some components may be combined, or a different component deployment may be used. Thus, the computer device 800 illustrated in FIG. 8 is merely exemplary and other computer devices are possible without departing from the scope of the present disclosure.

In an exemplary embodiment, a computer device is further provided, including a processor and a memory, the memory storing at least one instruction, at least one program, a code set, or an instruction set. The at least one instruction, the at least one program, the code set, or the instruction set are configured to be executed by one or more processors, to implement the video play method.

In an exemplary embodiment, a non-transitory computer-readable storage medium is further provided, the storage medium storing at least one instruction, at least one program, a code set, or an instruction set, the at least one instruction, the at least one program, the code set, or the instruction set, when being executed by a processor of a computer device, implementing the video play method.

The computer-readable storage medium may be a non-transitory computer-readable storage medium such as a ROM, a RAM, a CD-ROM, a magnetic tape, a floppy disk, an optical data storage device, or the like.

In an exemplary embodiment, a computer program product is further provided. When the computer program product is executed, the computer program product is configured to implement the video play method.

It is to be understood that "plurality of" mentioned in the specification means two or more. The term "and/or" describes an association relationship for describing associated objects and represents that three relationships may exist. For example, A and/or B may represent the following three cases: Only A exists, both A and B exist, and only B exists. The character "/" in this specification generally indicates an "or" relationship between the associated objects.

The foregoing descriptions are merely exemplary embodiments of this application, but are not intended to limit this application. Any modification, equivalent replacement, or improvement made within the spirit and principle of this application shall fall within the protection scope of this application.

What is claimed is:

1. A video play method, performed by a terminal, the method comprising:
    obtaining, by circuitry of the terminal, a first video file;
    slicing, by the circuitry, the first video file to generate n first slice files, n being an integer greater than 1;
    generating, by the circuitry, a play index, the play index including entries respectively corresponding to the n first slice files;
    slicing, by the circuitry, a second video file to generate m second slice files, m being a positive integer greater than 1;
    in response to a determination that an insert timestamp of the second video file falls between start and end timestamps of an $i^{th}$ first slice file,
        modifying the play index by inserting, by the circuitry, entries respectively corresponding to the m second slice files between an entry corresponding to the $i^{th}$ first slice file and an entry corresponding to a $(i+1)^{th}$ first slice file in the play index, i being a positive integer less than n;
    playing, by the circuitry, the first slice files in sequence according to the modified play index;
    playing, by the circuitry, the second video file after a time corresponding to the end timestamp of the $i^{th}$ first slice file and before the $(i+1)^{th}$ first slice file is played according to the modified play index; and
    displaying, by the circuitry, a player interface including a progress bar corresponding to the modified play index such that the progress bar is adjustable to play any of the n first slice files and any of the m second slice files.

2. The method according to claim 1, wherein the playing the second video file comprises:
    loading a preset plug-in;
    playing the second video file by using the preset plug-in; and
    displaying, with the preset plug-in while playing the second video file, a user interface (UI) element related to the second video file.

3. The method according to claim 2, wherein the UI element comprises at least one of a countdown control or a click-for-detail control.

4. The method according to claim 1, further comprising: transmitting a play status of the second video file to a third-party monitoring address corresponding to the second video file.

5. The method according to claim 1, further comprising: after playing the second video file:
adjusting, in response to obtaining an adjustment of the progress bar during the playing of the second video file, play progress according to the obtained adjustment of the progress bar.

6. The method according to claim 1, further comprising: before generating the play index:
obtaining related information of a current login account, the related information of the current login account comprising at least one of identification information of the first video file, gender, region, age, preference, or a historical play record corresponding to the current login account;
transmitting the related information of the current login account to a server; and
receiving related information, transmitted by the server, of the second video file matching the related information of the current login account, the related information of the second video file comprising at least one of the insert timestamp, duration, a file address, a link address, or a third-party monitoring address.

7. The method according to claim 6, further comprising selecting the second video file based on the related information of the current login account and the related information of the second video file,
wherein the second video file is a creative insert advertisement.

8. The method according to claim 1, wherein each of the entries corresponding to the m second slice files includes address information and duration of a corresponding second slice file.

9. The method according to claim 8, further comprising:
playing, based on adjustment of the progress bar, k non-consecutive second slice files, k being a positive integer less than m.

10. A non-transitory computer-readable storage medium storing computer-readable instructions that, when executed by a processor, cause the processor to perform the method according to claim 1.

11. A video play apparatus, comprising:
circuitry configured to:
obtain a first video file;
slice the first video file to generate n first slice files, n being an integer greater than 1;
generate a play index, the play index including entries respectively corresponding to the n first slice files;
slice a second video file to generate m second slice files, m being a positive integer greater than 1;
in response to a determination that an insert timestamp of the second video file falls between start and end timestamps of an $i^{th}$ first slice file,
modify the play index by inserting entries respectively corresponding to the m second slice files between an entry corresponding to the $i^{th}$ first slice file and an entry corresponding to a $(i+1)^{th}$ first slice file in the play index, i being a positive integer less than n;
play the first slice files in sequence according to the modified play index;
play the second video file after a time corresponding to the end timestamp of the $i^{th}$ first slice file and before the $(i+1)^{th}$ first slice file is played according to the modified play index; and
display a player interface including a progress bar corresponding to the modified play index such that the progress bar is adjustable to play any of the n first slice files and any of the m second slice files.

12. A video play system, comprising:
a first server configured to store a first video file;
a second server configured to store a second video file; and
a computer device including circuitry configured to:
obtain the first video file from the first server,
obtain the second video file from the second server,
slice the first video file to generate n first slice files, n being an integer greater than 1,
generate a play index including entries respectively corresponding to the n first slice files,
slice the second video file to generate m second slice files, m being a positive integer greater than 1;
in response to a determination that an insert timestamp of the second video file falls between start and end timestamps of an $i^{th}$ first slice file,
modify the play index by inserting entries respectively corresponding to the m second slice files between an entry corresponding to the $i^{th}$ first slice file and an entry corresponding to a $(i+1)^{th}$ first slice file in the play index, i being a positive integer less than n,
play the first slice files in sequence according to the modified play index,
play the second video file after a time corresponding to the end timestamp of the $i^{th}$ first slice file and before the $(i+1)^{th}$ first slice file is played according to the modified play index; and
display a player interface including a progress bar corresponding to the modified play index such that the progress bar is adjustable to play any of the n first slice files and any of the m second slice files.

13. The system according to claim 12, wherein the circuitry of the computer device is further configured to:
load a preset plug-in;
play the second video file with the preset plug-in; and
display, with the preset plug-in while playing the second video file, a user interface (UI) element related to the second video file.

14. The system according to claim 13, wherein the UI element includes at least one of a countdown control or a click-for-detail control.

15. The system according to claim 12, wherein the circuitry of the computer device is further configured to:
transmit a play status of the second video file to a third-party monitoring address corresponding to the second video file.

16. The system according to claim 12, wherein the circuitry of the computer device is further configured to:
adjust, in response to obtaining an adjustment of the progress bar during the playing the second video file, play progress according to the obtained adjustment of the progress bar.

17. The system according to claim 12, wherein the circuitry of the computer device is further configured to:
obtain related information of a current login account, the related information of the current login account comprising at least one of identification information of the first video file, gender, region, age, preference, or a historical play record corresponding to the current login account;

transmit the related information of the current login account to the second server; and receive related information, transmitted by the second server, of the second video file matching the related information of the current login account, the related information of the second video file comprising at least one of the insert timestamp, duration, a file address, a link address, or a third-party monitoring address.

18. The system according to claim 17, wherein the circuitry of the computer device is further configured to select the second video file based on the related information of the current login account and the related information of the second video file, wherein the second video file is a creative insert advertisement.

19. The system according to claim 12, wherein each of the entries corresponding to the m second slice files includes address information and duration of a corresponding second slice file.

20. The system according to claim 19, wherein the circuitry of the computer device is further configured to:

play, based on adjustment of the progress bar, k non-consecutive second slice files, k being a positive integer less than m.

* * * * *